United States Patent
Kawaguchi et al.

(10) Patent No.: US 12,510,301 B2
(45) Date of Patent: Dec. 30, 2025

(54) HEAT EXCHANGER HAVING PLATE MEMBERS

(71) Applicant: DENSO CORPORATION, Kariya (JP)

(72) Inventors: Shogo Kawaguchi, Kariya (JP); Isao Tamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 177 days.

(21) Appl. No.: 18/479,597

(22) Filed: Oct. 2, 2023

(65) Prior Publication Data

US 2024/0027137 A1 Jan. 25, 2024

Related U.S. Application Data

(63) Continuation of application No. PCT/JP2022/009951, filed on Mar. 8, 2022.

(30) Foreign Application Priority Data

Apr. 8, 2021 (JP) .................................. 2021-065825

(51) Int. Cl.
*F28D 9/00* (2006.01)
*F28D 9/02* (2006.01)
*F28F 9/02* (2006.01)

(52) U.S. Cl.
CPC .......... *F28D 9/0075* (2013.01); *F28D 9/0068* (2013.01); *F28D 9/02* (2013.01); *F28F 9/0282* (2013.01)

(58) Field of Classification Search
CPC ........ F28D 9/0068; F28D 9/0075; F28D 9/02; F28F 9/0282
See application file for complete search history.

(56) References Cited

U.S. PATENT DOCUMENTS

2007/0089871 A1* 4/2007 Andersson .............. F28D 9/005
165/167
2008/0283231 A1* 11/2008 Horte ...................... F28D 9/005
165/167

(Continued)

FOREIGN PATENT DOCUMENTS

CN 205690942 U * 11/2016
FR 3059400 A1 * 6/2018 .............. F25B 39/04

(Continued)

OTHER PUBLICATIONS

Translation of CN205690942U named CN205690942U (Year: 2016).*
Translation of FR3059400A1 named FR3059400A1 (Year: 2018).*

*Primary Examiner* — Paul Alvare
(74) *Attorney, Agent, or Firm* — Harness, Dickey & Pierce, P.L.C.

(57) ABSTRACT

A plurality of plate members are stacked together to form a plurality of refrigerant passages and a plurality of fluid passages. At least one plate member among the plate members includes: a flow inlet which is placed at one end portion of a corresponding refrigerant passage formed at the at least one plate member and is configured to input the refrigerant into the corresponding refrigerant passage; a flow outlet which is placed at another end portion of the corresponding refrigerant passage and is configured to output the refrigerant conducted through the corresponding refrigerant passage; a recess which is placed adjacent to one of the flow inlet and the flow outlet; a communication passage which is configured to communicate the one of the flow inlet and the flow outlet to the recess; and a partition wall which partitions between the corresponding refrigerant passage and the communication passage.

5 Claims, 14 Drawing Sheets

(56) References Cited

U.S. PATENT DOCUMENTS

| | | | | |
|---|---|---|---|---|
| 2011/0083833 A1* | 4/2011 | Zorzin | ................... | F28F 3/046 |
| | | | | 165/166 |
| 2016/0010929 A1 | 1/2016 | Takahashi et al. | | |
| 2016/0356560 A1* | 12/2016 | Wei | ........................... | F28F 3/10 |
| 2017/0241716 A1* | 8/2017 | Schatz-Knecht | ..... | F28D 9/0043 |
| 2019/0017748 A1* | 1/2019 | Sun | ........................ | F28F 3/048 |
| 2022/0136745 A1 | 5/2022 | Kawaguchi et al. | | |

FOREIGN PATENT DOCUMENTS

| | | | |
|---|---|---|---|
| JP | 2007514124 | A | 5/2007 |
| JP | 2015059669 | A | 3/2015 |
| JP | 2019219091 | A | 12/2019 |
| JP | 2021014973 | A | 2/2021 |

* cited by examiner

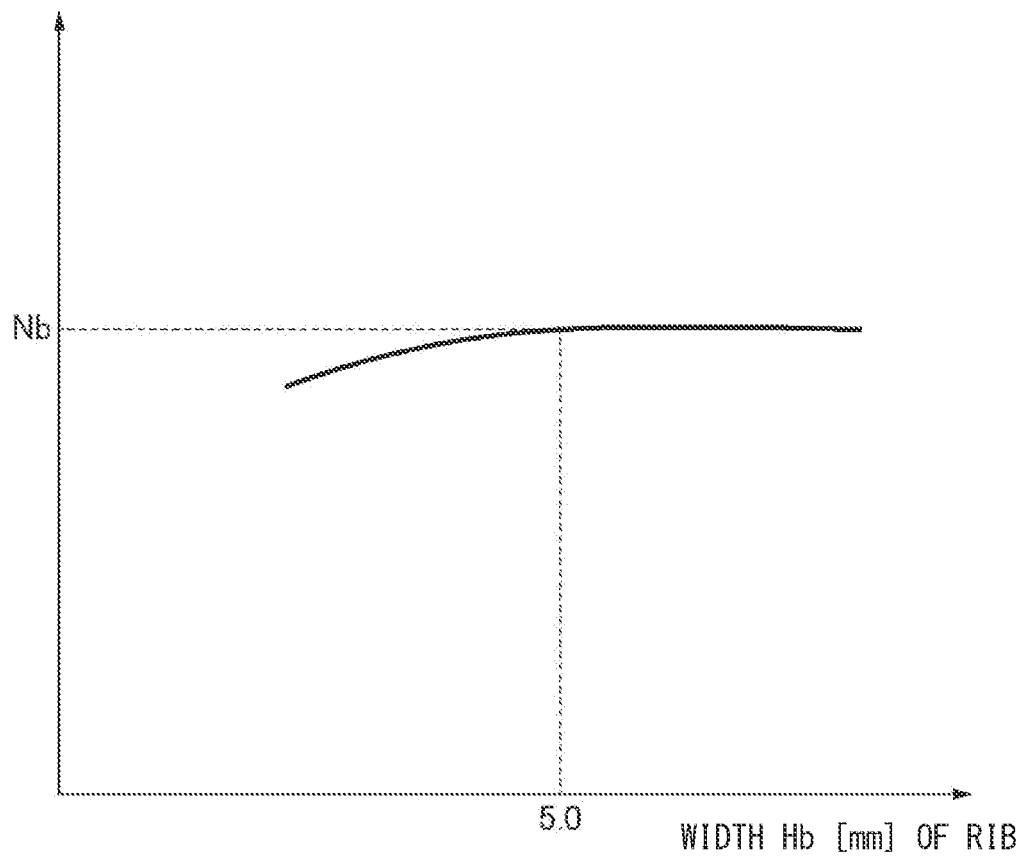

HEAT EXCHANGER HAVING PLATE MEMBERS

CROSS REFERENCE TO RELATED APPLICATIONS

This application is a continuation application of International Patent Application No. PCT/JP2022/009951 filed on Mar. 8, 2022, which designated the U.S. and claims the benefit of priority from Japanese Patent Application No. 2021-065825 filed on Apr. 8, 2021. The entire disclosures of all of the above applications are incorporated herein by reference.

TECHNICAL FIELD

The present disclosure relates to a heat exchanger.

BACKGROUND

Previously, there has been proposed a heat exchanger. This heat exchanger includes a plate stack and a gas-liquid separator. The plate stack is formed by stacking a plurality of plate members in a plate stacking direction. A refrigerant passage, through which a refrigerant flows, and a coolant passage, through which a coolant flows, are alternately arranged in the plate stacking direction at the plate stack. An inlet connector and an outlet connector for the refrigerant are installed to one end surface of the plate stack, which faces one side in the plate stacking direction. The gas-liquid separator is installed to the other end surface of the plate stack which faces the other side in the plate stacking direction.

SUMMARY

This section provides a general summary of the disclosure, and is not a comprehensive disclosure of its full scope or all of its features.

According to one aspect of the present disclosure, there is provided a heat exchanger including a plurality of plate members which are stacked together to form a plurality of refrigerant passages and a plurality of fluid passages. The heat exchanger is configured to exchange heat between a refrigerant flowing through the plurality of refrigerant passages and a fluid flowing through the plurality of fluid passages. At least one plate member among the plurality of plate members includes a flow inlet, a flow outlet, a recess, a communication passage and a partition wall. The flow inlet is placed at one end portion of a corresponding refrigerant passage among the plurality of refrigerant passages. The corresponding refrigerant passage is formed at the at least one plate member, and the flow inlet is configured to input the refrigerant into the corresponding refrigerant passage. The flow outlet is placed at another end portion of the corresponding refrigerant passage and is configured to output the refrigerant conducted through the corresponding refrigerant passage. The recess is placed adjacent to one of the flow inlet and the flow outlet and is communicated with the corresponding refrigerant passage. The communication passage is configured to communicate the one of the flow inlet and the flow outlet to the recess. The partition wall partitions between the corresponding refrigerant passage and the communication passage.

BRIEF DESCRIPTION OF DRAWINGS

The drawings described herein are for illustrative purposes only of selected embodiments and not all possible implementations, and are not intended to limit the scope of the present disclosure.

FIG. 14 is a graph showing a relationship between a width of a rib and the number of repetitions of pressurization according to the second embodiment.

DETAILED DESCRIPTION

Figure 1:
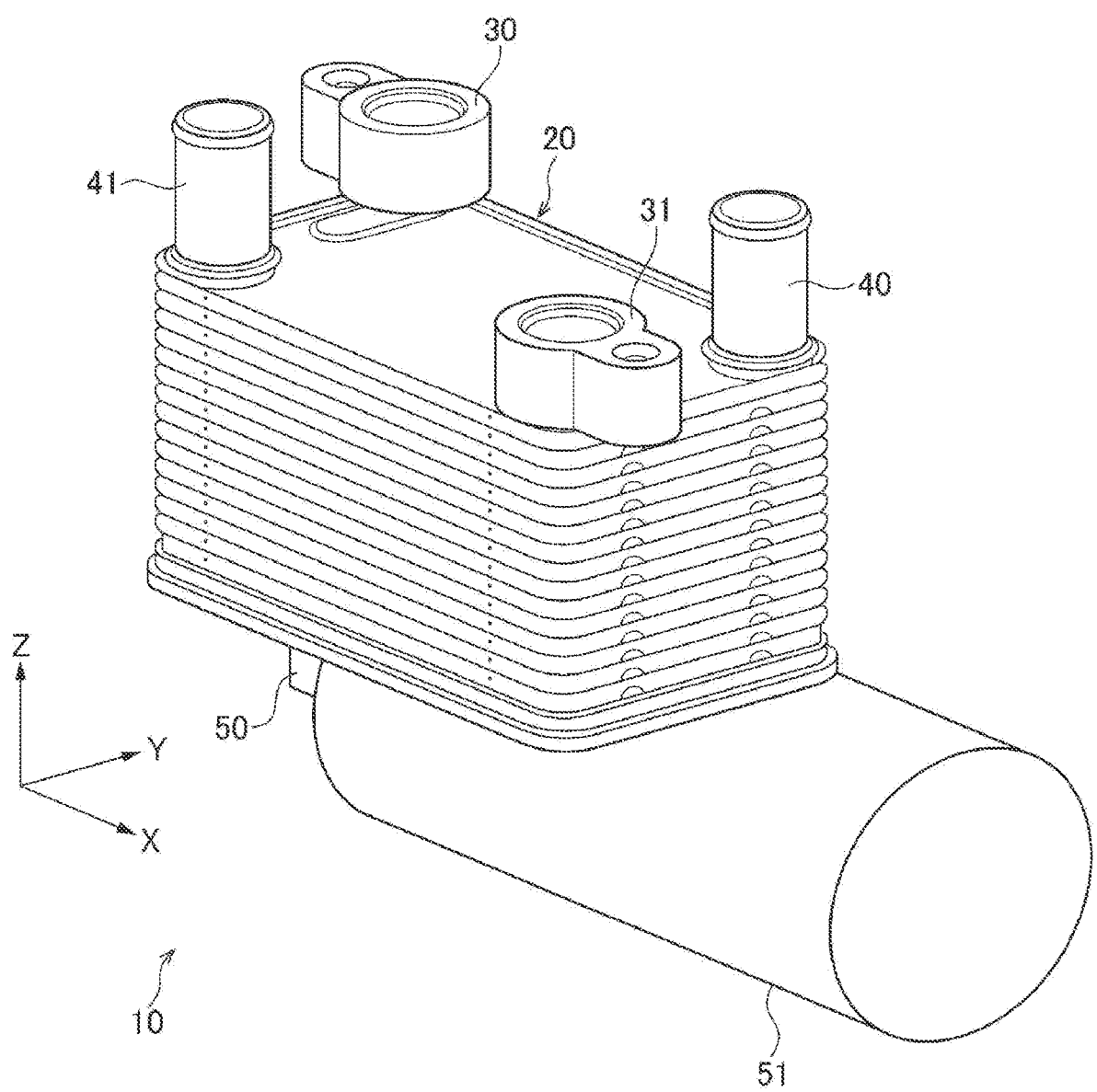
FIG. 1 is a perspective view showing a perspective-view structure of a heat exchanger according to a first embodiment.

Previously, there has been proposed a heat exchanger. This heat exchanger includes a plate stack and a gas-liquid separator. The plate stack is formed by stacking a plurality of plate members in a plate stacking direction. A refrigerant passage, through which a refrigerant flows, and a coolant passage, through which a coolant flows, are alternately arranged in the plate stacking direction at the plate stack. An inlet connector and an outlet connector for the refrigerant are installed to one end surface of the plate stack, which faces one side in the plate stacking direction. The gas-liquid separator is installed to the other end surface of the plate stack which faces the other side in the plate stacking direction.

The plate stack includes a condensing unit and a subcooling unit. A gas-phase refrigerant flows into the condensing unit through the inlet connector. At the condensing unit, the gas-phase refrigerant and the coolant exchange heat therebetween, and thereby there is formed a two-phase refrigerant that is a mixture of the gas-phase refrigerant and a liquid-phase refrigerant. The two-phase refrigerant, which is generated at the condensing unit, flows into the gas-liquid separator and is separated into the gas-phase refrigerant and the liquid-phase refrigerant at the gas-liquid separator. The liquid-phase refrigerant, which is separated at the gas-liquid separator, flows into the subcooling unit. At the subcooling unit, the liquid-phase refrigerant and the coolant exchange the heat therebetween, and thereby the liquid-phase refrigerant is further cooled. The liquid-phase refrigerant, which is subcooled at the subcooling unit, is discharged to the outside of the plate stack through the outlet connector.

The plate stack includes a plurality of primary plate members, which form the condensing unit, and a plurality of secondary plate members, which form the subcooling unit, as the plate members described above. Each of the primary plate members includes: a flow inlet which is configured to guide the refrigerant received from the inlet connector into an inside of the primary plate member; a flow outlet which is configured to guide the refrigerant passed through the inside of the primary plate member toward the gas-liquid separator; and a through-hole forming portion which is configured to guide the refrigerant passed through the subcooling unit toward the outlet connector. Furthermore, each of the secondary plate members includes: a flow inlet which is configured to guide the refrigerant outputted from the gas-liquid separator into an inside of the secondary plate member; a flow outlet which is configured to guide the refrigerant passed through the inside of the secondary plate member toward the outlet connector; and a through-hole forming portion which is configured to guide the refrigerant passed through the condensing unit toward the gas-liquid separator.

In the heat exchanger described above, at each plate member, the refrigerant tends to flow from the flow inlet to the flow outlet through a shortest path, so that a dead water zone (stagnated flow zone), in which the refrigerant is less likely to flow, may possibly be formed at the inside of each plate member. When such a dead water zone is formed at the inside of the plate member, a flow velocity of the refrigerant is increased in the remaining zone which is other than the dead water zone at the inside of the plate member. This is undesirable because it causes an increase in the pressure loss of the refrigerant.

According to one aspect of the present disclosure, there is provided a heat exchanger that includes a plurality of plate members which are stacked together to form a plurality of refrigerant passages and a plurality of fluid passages. The heat exchanger is configured to exchange heat between a refrigerant flowing through the plurality of refrigerant passages and a fluid flowing through the plurality of fluid passages. At least one plate member among the plurality of plate members includes: a flow inlet which is placed at one end portion of a corresponding refrigerant passage among the plurality of refrigerant passages, wherein the corresponding refrigerant passage is formed at the at least one plate member, and the flow inlet is configured to input the refrigerant into the corresponding refrigerant passage; a flow outlet which is placed at another end portion of the corresponding refrigerant passage and is configured to output the refrigerant conducted through the corresponding refrigerant passage; a recess which is placed adjacent to one of the flow inlet and the flow outlet and is communicated with the corresponding refrigerant passage; a communication passage which is configured to communicate the one of the flow inlet and the flow outlet to the recess; and a partition wall which partitions between the corresponding refrigerant passage and the communication passage.

With the above configuration, a portion of the refrigerant, which flows from the flow inlet to the corresponding refrigerant passage, or a portion of the refrigerant, which flows from the corresponding refrigerant passage to the flow outlet, flows into the recess. Therefore, it is possible to generate another flow of the refrigerant, which is different from the flow of the refrigerant linearly directed from the flow inlet to the flow outlet, and thereby the generation of the dead water zone described above is limited. As a result, the pressure loss of the refrigerant can be reduced.

Hereinafter, embodiments of a heat exchanger will be described with reference to the drawings. In order to facilitate understanding of the description, the same components are indicated by the same reference signs as much as possible in each drawing, and redundant descriptions are omitted.

First Embodiment

First of all, a heat exchanger 10 of a first embodiment shown in FIG. 1 will be described. The heat exchanger 10 is used, for example, as a condenser in a refrigeration cycle of an air conditioning apparatus of a vehicle. The refrigeration cycle includes a compressor, the condenser, an expansion valve and an evaporator. A gas-phase refrigerant, which has a high temperature and a high pressure and is discharged from the compressor, flows into the heat exchanger 10. The heat exchanger 10 exchanges the heat between the gas-phase refrigerant, which has the high temperature and the high pressure, and a coolant (also referred to as a cooling water) to release the heat of the refrigerant to the coolant and thereby condense the gas-phase refrigerant. The heat exchanger 10 discharges the condensed liquid-phase refrigerant to the expansion valve. In the present embodiment, the coolant serves as a fluid.

Figure 2:
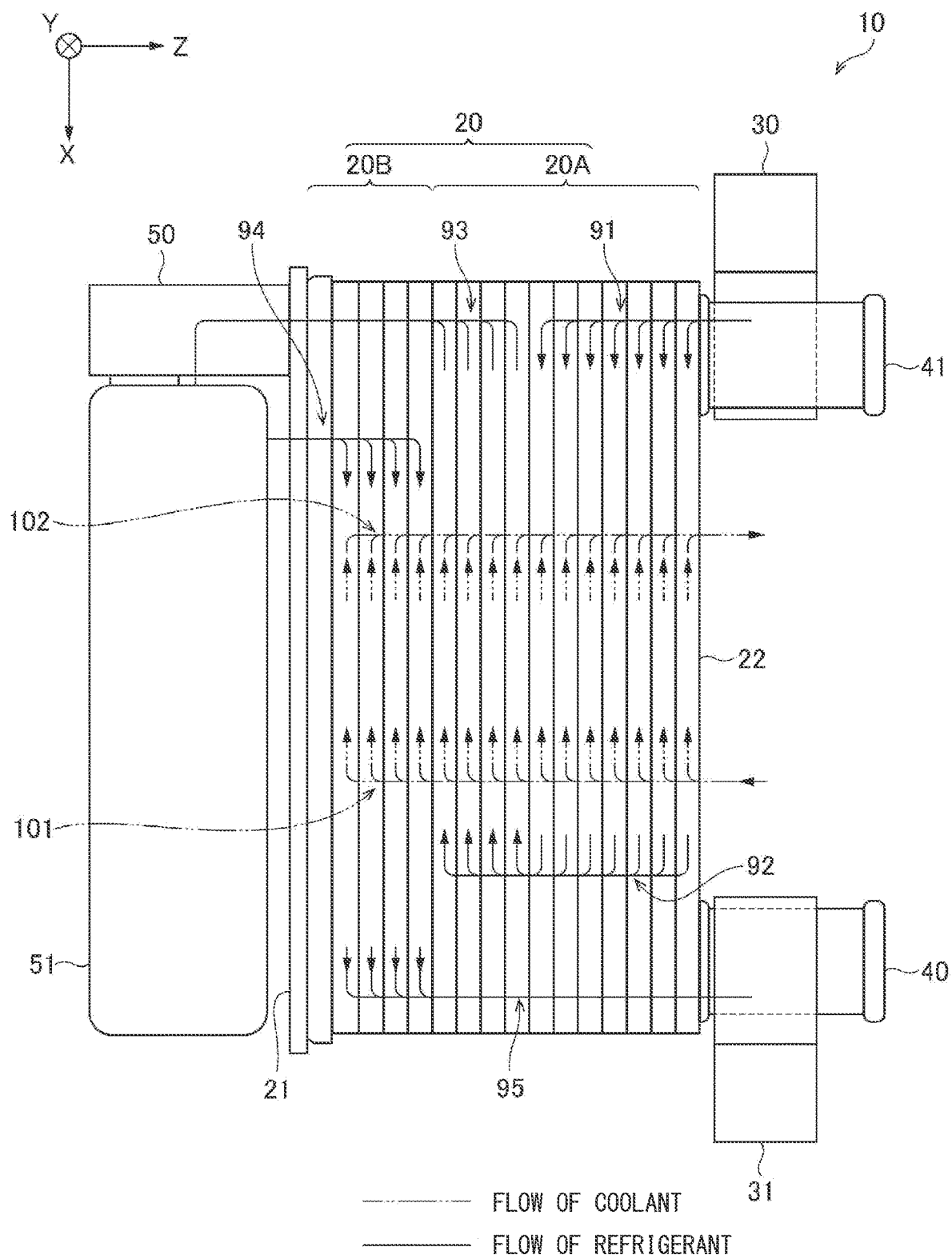
FIG. 2 is a front view showing a front-view structure of the heat exchanger according to the first embodiment.

As shown in FIG. 2, the heat exchanger 10 includes a core 20, a refrigerant inlet connector 30, a refrigerant outlet connector 31, a coolant inlet connector 40, a coolant outlet connector 41, a receiver connector 50 and a gas-liquid separator 51.

The core 20 includes a plurality of plates which are stacked together in a direction of an arrow Z in the drawing. Hereinafter, the direction of the arrow Z will be also referred to as a plate stacking direction (or a stacking direction) Z. The core 20 has a condensing unit 20A and a subcooling unit 20B. In the core 20, the condensing unit 20A exchanges the heat between the gas-phase refrigerant, which is discharged from the compressor, and the coolant to condense the gas-phase refrigerant. In the core 20, the subcooling unit 20B exchanges the heat between the liquid-phase refrigerant, which is discharged from the gas-liquid separator 51, and the coolant to further cool the liquid-phase refrigerant.

The gas-liquid separator 51 is installed to one end surface 21 of the core which faces one side in the plate stacking direction Z. The gas-liquid separator 51 is coupled to the core 20 through the receiver connector 50. The gas-liquid separator 51 separates the refrigerant, which is discharged from the condensing unit 20A, into the gas-phase refrigerant and the liquid-phase refrigerant, and the gas-liquid separator 51 outputs the separated liquid-phase refrigerant to the subcooling unit 20B.

Each of the connectors 30, 31, 40, 41 is placed at the other end surface 22 of the core 20 which faces the other side in the plate stacking direction Z. An inlet-side refrigerant pipe is joined to the refrigerant inlet connector 30. The gas-phase refrigerant, which is discharged from the compressor, flows into the condensing unit through the inlet-side refrigerant pipe and the refrigerant inlet connector 30. An outlet-side refrigerant pipe is joined to the refrigerant outlet connector 31. The liquid-phase refrigerant, which is subcooled by the subcooling unit 20B, is discharged to the expansion valve through the refrigerant outlet connector 31 and the outlet-side refrigerant pipe. An inlet-side coolant pipe is joined to the coolant inlet connector 40. The coolant flows into the core 20 through the inlet-side coolant pipe and the coolant inlet connector 40. An outlet-side coolant pipe is joined to the coolant outlet connector 41. The coolant, which has exchanged the heat with the refrigerant at the core 20, is discharged to the outside through the coolant outlet connector 41 and the outlet-side coolant pipe.

Next, the structure of the core 20 will be described in detail.

Figure 3:
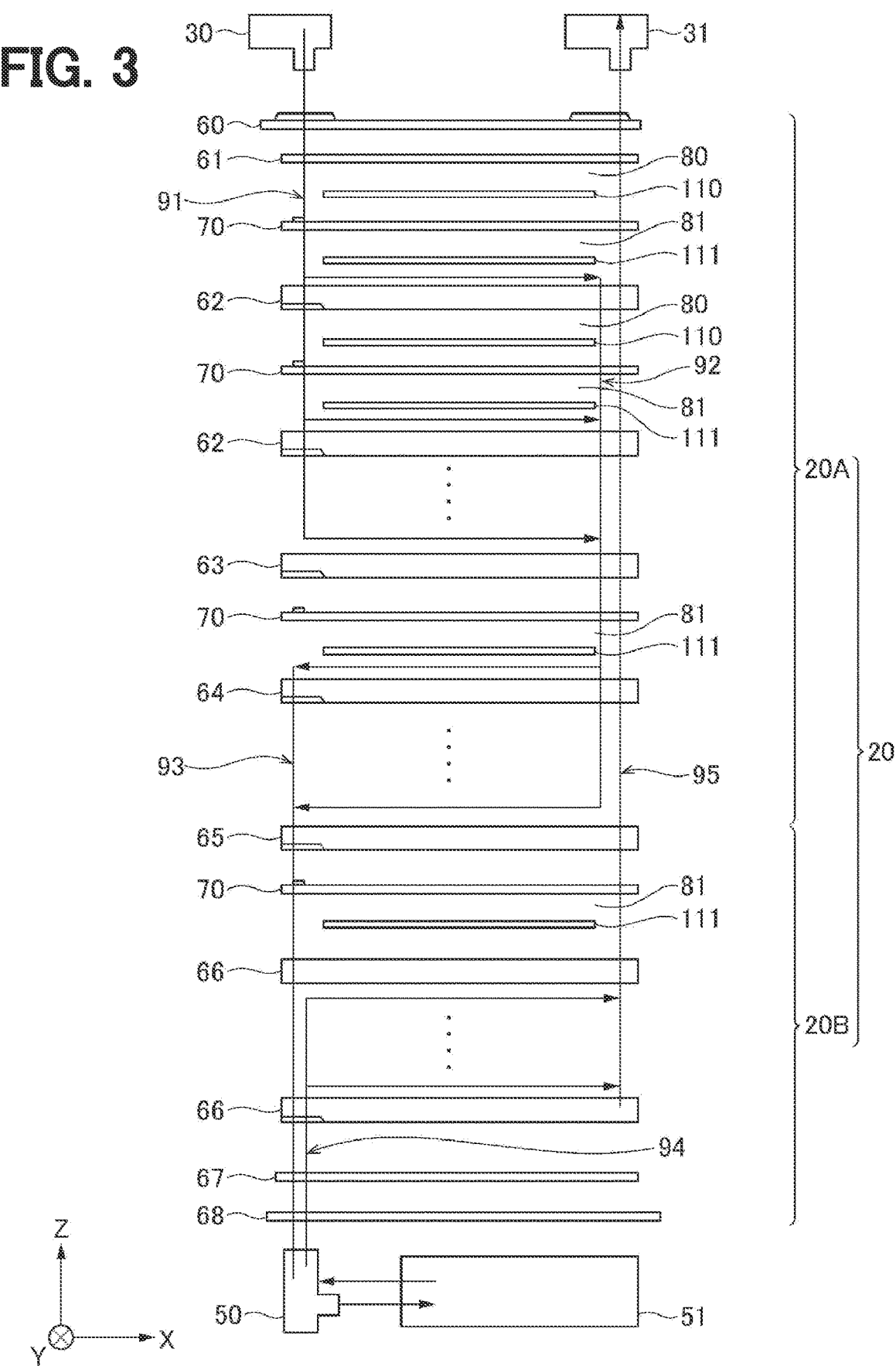
FIG. 3 is an exploded diagram schematically showing an exploded-view structure of the heat exchanger of the first embodiment.

As shown in FIG. 3, the core 20 includes: a top plate 60; a top outer plate 61; a plurality of primary outer plates 62; a primary partition outer plate 63; a plurality of secondary outer plates 64; and a plurality of inner plates 70 each of which is interposed between corresponding adjacent two of the outer plates 61-64, and these plates 60-64, 70 are stacked in the plate stacking direction Z and form the condensing unit 20A. Furthermore, the core 20 includes: a secondary partition outer plate 65; a plurality of tertiary outer plates 66; a bottom plate 67; a bracket 68; and a plurality of inner plates 70 each of which is interposed between corresponding adjacent two of the outer plates 65, 66, and these plates 65-68, 70 are stacked in the plate stacking direction Z and form the subcooling unit 20B. In the present embodiment, these plates 61-66, 70 serve as a plurality of plate members.

Each gap, which is formed between corresponding adjacent two of the outer plates 61-66, is partitioned by the corresponding inner plate 70 into two independent spaces 80, 81 in the plate stacking direction Z. One space 80 among these two spaces 81 forms a coolant passage in which the coolant flows. The other space 81 among these two spaces 80, 81 forms a refrigerant passage 81, in which the refrigerant flows. In the following description, the spaces 80, 81 will be referred to as a coolant passage and a refrigerant passage 81, respectively. A coolant fin (coolant plate fin) 110, which increases a heat conducting surface area relative to the coolant, is arranged in the coolant passage 80. A refrigerant fin (refrigerant plate fin) 111, which increases a heat conducting surface area relative to the refrigerant, is arranged in the refrigerant passage 81. In the present embodiment, the coolant passage 80 serves as a fluid passage.

A plurality of refrigerant tank holes 91-95, which conduct the refrigerant, are formed at the inside of the core 20.

Specifically, a first refrigerant tank hole 91 is formed to extend in the plate stacking direction Z through each of: a left end portion of each of the top plate 60, the top outer plate 61 and the primary outer plates 62; and a left end portion of each of the inner plates 70 each of which is placed between the corresponding adjacent two of the outer plates 61, 62. An upper end portion of the first refrigerant tank hole 91 is communicated with the refrigerant inlet connector 30.

A second refrigerant tank hole 92 is formed to extend in the plate stacking direction Z through each of: a right end portion of each of the primary outer plates 62, the primary partition outer plate 63 and the secondary outer plates 64; and a right end portion of each of the inner plates 70 each of which is placed between the corresponding adjacent two of the outer plates 62-64.

A third refrigerant tank hole 93 is formed to extend in the plate stacking direction Z through each of: a left end portion of each of the secondary outer plates 64, the secondary partition outer plate 65, the tertiary outer plates 66, the bottom plate 67 and the bracket 68; and a left end portion of each of the inner plates 70 each of which is placed between the corresponding adjacent two of the outer plates 64-66. A lower end portion of the third refrigerant tank hole 93 is communicated with the gas-liquid separator 51 through the receiver connector 50.

A fourth refrigerant tank hole 94 is formed to extend in the plate stacking direction Z through each of: a left end portion of each of the tertiary outer plates 66, the bottom plate 67 and the bracket 68; and a left end portion of each of the inner plates 70 each of which is placed between the corresponding adjacent two of the tertiary outer plates 66. A lower end portion of the fourth refrigerant tank hole 94 is communicated with the gas-liquid separator 51 through the receiver connector 50.

A fifth refrigerant tank hole 95 is formed to extend in the plate stacking direction Z through each of: a right end portion of each of the top plate 60 and the outer plates 61-66; and a right end portion of each of the inner plates 70 each of which is placed between the corresponding adjacent two of the outer plates 61-66.

Figure 4:
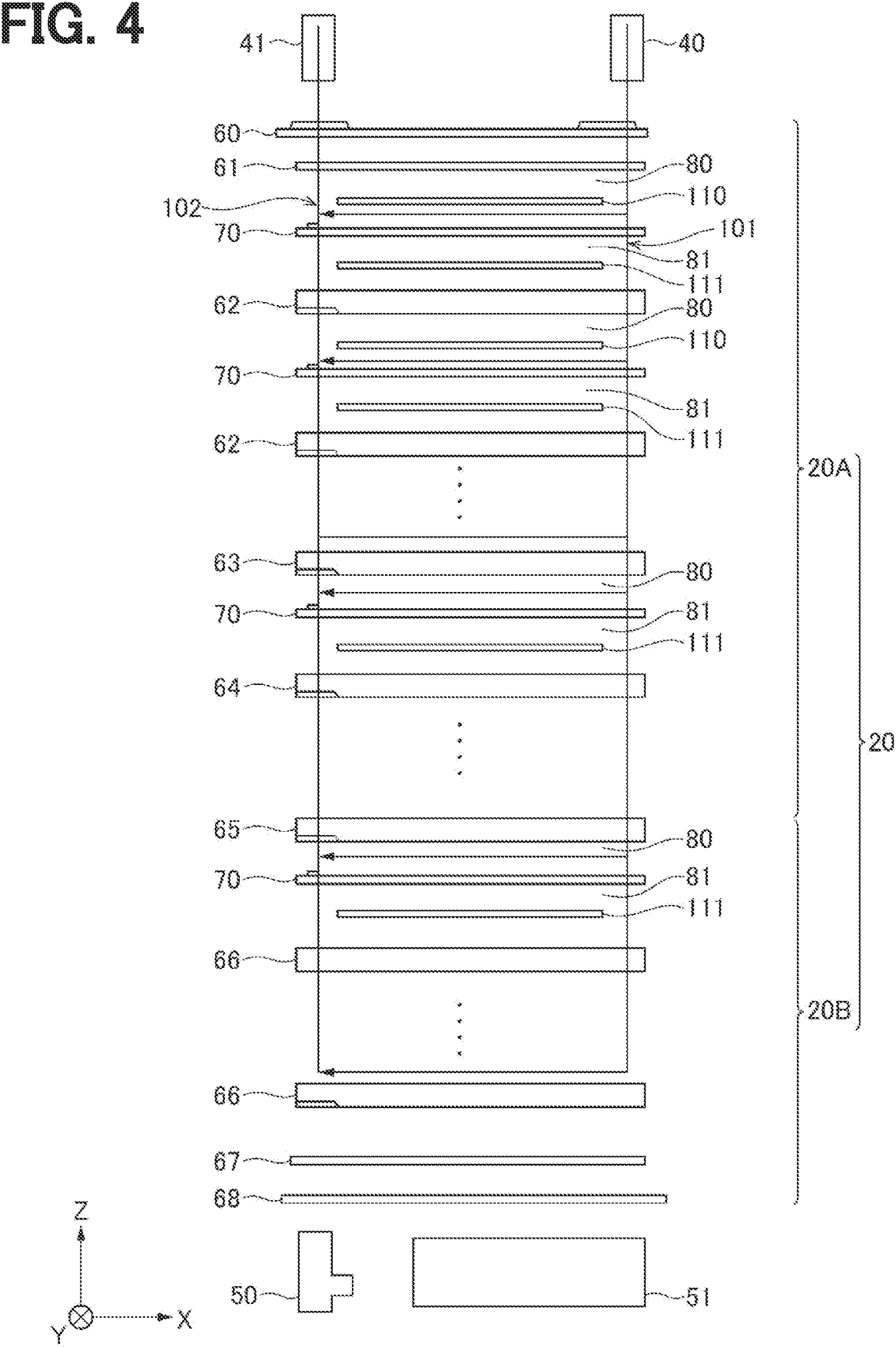
FIG. 4 is an exploded diagram schematically showing an exploded-view structure of the heat exchanger of the first embodiment.

Furthermore, as shown in FIG. 4, coolant tank holes 101, 102, through which the coolant flows, are also formed at the core 20.

Specifically, a first coolant tank hole 101 is formed to extend in the plate stacking direction Z through each of: the right end portion of each of the top plate 60 and the outer plates 61-66; and the right end portion of each of the inner plates 70 each of which is placed between the corresponding adjacent two of the outer plates 61-66.

A second coolant tank hole 102 is formed to extend in the plate stacking direction Z through each of: the left end portion of each of the top plate 60 and the outer plates 61-66; and the left end portion of each of the inner plates 70 each of which is placed between the corresponding adjacent two of the outer plates 61-66.

In this heat exchanger 10, as shown in FIG. 4, the coolant, which flows into the first coolant tank hole 101 through the inlet-side coolant pipe joined to the coolant inlet connector 40, is distributed to a right end portion of each of the coolant passages each of which is formed between the corresponding adjacent two of the outer plates 61-66, and this coolant flows from the right end portion toward the left end portion at each coolant passage 80. The coolant, which flows to the left end portion at each coolant passage 80, is collected at the second coolant tank hole 102 and is then discharged through the outlet-side coolant pipe connected to the coolant outlet connector 41.

In this heat exchanger 10, as shown in FIG. 3, the gas-phase refrigerant, which flows into the first refrigerant tank hole 91 through the inlet-side refrigerant pipe joined to the refrigerant inlet connector 30, is distributed to a left end portion of each of the corresponding refrigerant passages 81 each of which is formed between the corresponding adjacent two of the top outer plate 61, the primary outer plates 62 and the primary partition outer plate 63, and this coolant flows from the left end portion to the right end portion at each corresponding refrigerant passage 81. At this time, the gas-phase refrigerant, which flows in each corresponding refrigerant passage 81, exchanges the heat with the coolant, which flows in the adjacent coolant passage 80 that is adjacent to the refrigerant passage 81, so that the gas-phase refrigerant is condensed. The refrigerant, which flows to the right end portion at each corresponding refrigerant passage 81, is collected at an upper portion of the second refrigerant tank hole 92 and flows toward a lower portion of the second refrigerant tank hole 92.

The refrigerant, which flows toward the lower portion of the second refrigerant tank hole 92, is distributed to the right end portions of the corresponding refrigerant passages 81, each of which is formed by the corresponding two of the primary partition outer plate 63, the secondary outer plates 64 and the secondary partition outer plate 65, and this refrigerant flows from the right end portion to the left end portion at each corresponding refrigerant passage 81. At this time, the gas-phase refrigerant, which flows in each corresponding refrigerant passage 81, exchanges the heat with the coolant, which flows in the adjacent coolant passage 80 that is adjacent to the refrigerant passage 81, so that the gas-phase refrigerant is further condensed. The refrigerant, which flows to the left end portion of each corresponding refrigerant passage 81, is collected at an upper portion of the third refrigerant tank hole 93. Since the refrigerant is condensed, a two-phase refrigerant, which is a mixture of the gas-phase refrigerant and the liquid-phase refrigerant, is collected in the third refrigerant tank hole 93. The two-phase refrigerant, which is collected at the third refrigerant tank hole 93, flows into the gas-liquid separator 51 through the receiver connector 50.

The gas-liquid separator 51 separates the two-phase refrigerant, which is received from the third refrigerant tank hole 93 through the receiver connector 50, into the gas-phase refrigerant and the liquid-phase refrigerant. The liquid-phase refrigerant, which is separated by the gas-liquid separator 51, flows into a lower portion of the fourth refrigerant tank hole 94 through the receiver connector 50.

The liquid-phase refrigerant, which flows into the lower portion of the fourth refrigerant tank hole 94, is distributed to the left end portion of each of the corresponding refrigerant passages 81, each of which is formed by the corresponding two of the secondary partition outer plate 65 and the tertiary outer plates 66, and this refrigerant flows from the left end portion to the right end portion at each corresponding refrigerant passage 81. At this time, the liquid-phase refrigerant, which flows in each corresponding refrigerant passage 81, exchanges the heat with the coolant, which flows in the adjacent coolant passage 80 that is adjacent to the refrigerant passage 81, so that the liquid-phase refrigerant is further cooled. The liquid-phase refrigerant, which flows to the right end portion of each corresponding refrigerant passage 81, is collected at a lower portion of the fifth refrigerant tank hole 95 and is then guided from an upper portion of the fifth refrigerant tank hole 95 to the expansion valve through the outlet-side refrigerant pipe joined to the refrigerant outlet connector 31.

As discussed above, in the heat exchanger 10, the condensing unit 20A is formed by the region of the core 20, which extends from the top outer plate 61 to the secondary partition outer plate 65, and the subcooling unit 20B is formed by the other region of the core 20, which extends from the secondary partition outer plate 65 to the outermost tertiary outer plate 66.

Next, the structure of each of the primary outer plates 62, the secondary outer plates 64 and the tertiary outer plates 66 of the present embodiment will be described in detail.

Figure 5:
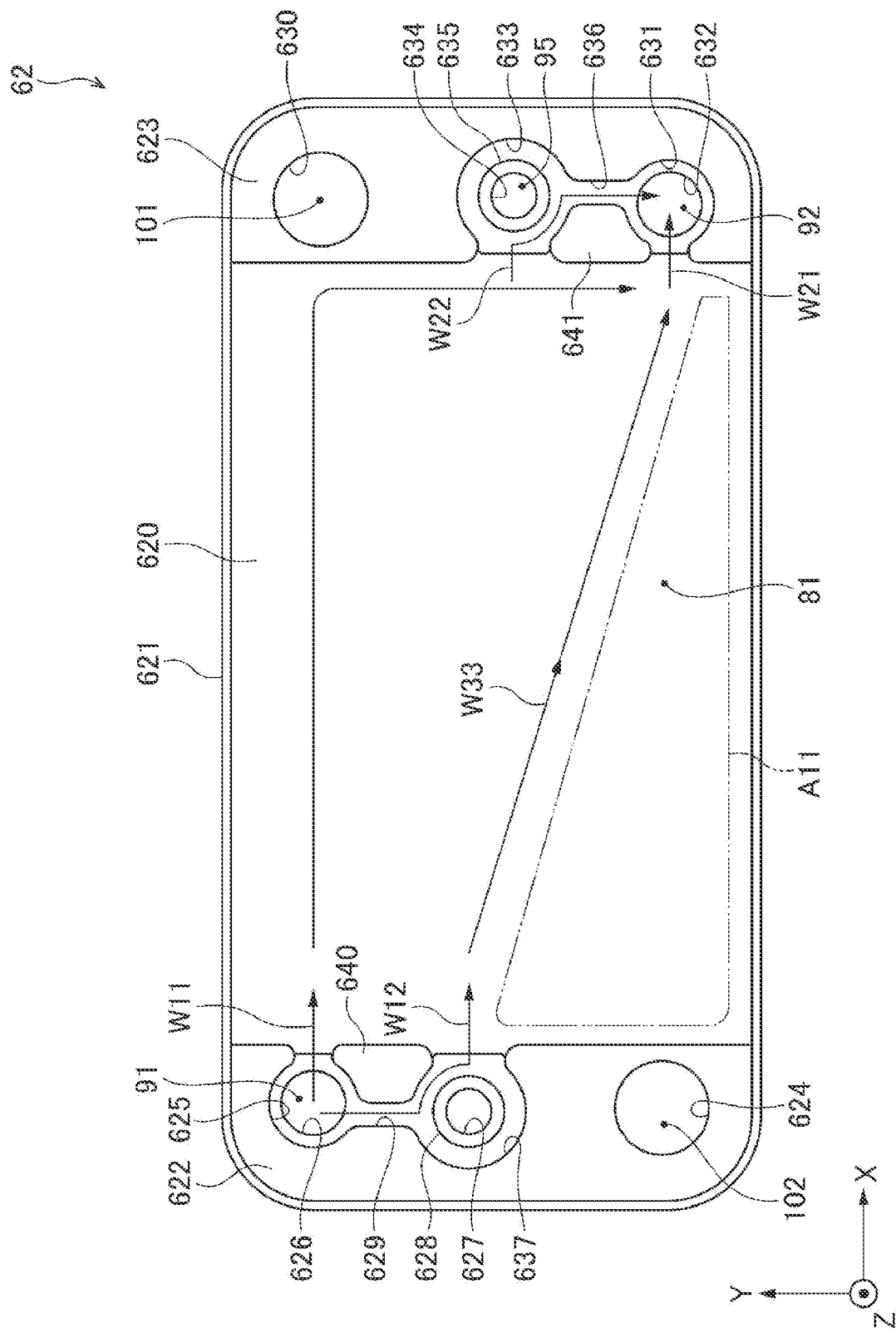
FIG. 5 is a plan view showing a plan-view structure of a primary outer plate of the first embodiment.

First of all, with reference to FIG. 5, the structure of the primary outer plate 62 will be described. As shown in FIG. 5, the primary outer plate 62 is made of a plate member and includes a bottom 620, an outer wall 621, a left inner wall 622 and a right inner wall 623, and the primary outer plate 62 is shaped in a cup form as a whole.

Specifically, a cross-section of the bottom 620, which is perpendicular to the plate stacking direction Z, is shaped in a rectangular form. In FIG. 5, a longitudinal direction of the bottom 620 is indicated by an arrow X, and a transverse direction of the bottom 620, which is perpendicular to the longitudinal direction, is indicated by an arrow Y.

The left inner wall 622 and the right inner wall 623 are placed at two end portions (longitudinal end portions) of the bottom 620 which are opposite to each other in the longitudinal direction X. Each of the inner walls 622, 623 projects from the bottom 620 in the plate stacking direction Z. A bottom surface of the corresponding inner plate 70 is joined to an upper surface of each of the inner walls 622, 623 by soldering.

The outer wall 621 is placed at an outer periphery of each of the bottom 620 and the inner walls 622, 623 and extends all around the bottom 620 and the inner walls 622, 623, and the outer wall 621 projects from the outer periphery of each of the bottom 620 and the inner walls 622, 623 in the plate stacking direction Z. An outer peripheral surface of the corresponding inner plate 70 is joined to an inner peripheral surface of the outer wall 621 by brazing.

In the core 20, at each primary outer plate 62, a space, which is surrounded by an upper surface of the bottom 620, an inner surface of each inner wall 622, 623, an inner surface of the outer wall 621 and the bottom surface of the corresponding inner plate 70, forms the refrigerant passage 81. The refrigerant fin 111, which is shown in FIG. 3, is installed at the refrigerant passage 81.

As shown in FIG. 5, a through-hole 624 extends through the left inner wall 622 in a plate thickness direction of the left inner wall 622 at one end portion of the left inner wall 622, which faces in the transverse direction Y. The through-hole 624 forms the second coolant tank hole 102.

A recess 625 is recessed at the other end portion of the left inner wall 622 which faces in the transverse direction Y. The recess 625 is communicated with the refrigerant passage 81. A through-hole 626 is formed at the recess 625 to extend through a bottom surface of the recess 625 in the plate thickness direction. Therefore, the through-hole 626 is placed adjacent to the outer wall 621 in the transverse direction Y. The through-hole 626 forms the first refrigerant tank hole 91. Therefore, the first refrigerant tank hole 91 is communicated with the refrigerant passage 81 through the recess 625. In the primary outer plate 62, the through-hole 626 serves as a flow inlet.

Furthermore, a recess 637 is recessed at a location between the through-hole 624 and the recess 625 in the transverse direction Y. The recess 637 is placed on an opposite side of the through-hole (serving as the flow inlet) 626 which is opposite to the outer wall 621 in the transverse direction Y. The recess 637 is communicated with the refrigerant passage 81. A through-hole 627 is formed at the recess 637 and extends through the primary outer plate 62 such that the through-hole 627 extends through a bottom surface of the recess 637 in the plate thickness direction, and a shield wall 628 extends all around an outer periphery of the through hole 627. The shield wall 628 is formed to block communication between the through-hole 627 and the refrigerant passage 81. In the primary outer plate 62, the through-hole 627 does not function as a passage of the refrigerant.

A communication passage 629, which communicates between the recess 625 and the recess 637, is formed at the left inner wall 622. A portion of the left inner wall 622, which is formed between the communication passage 629 and the refrigerant passage 81, functions as a rib 640 that partitions between the communication passage 629 and the refrigerant passage 81. In the primary outer plate 62, the rib 640 serves as a partition wall.

A through-hole 630 extends through the right inner wall 623 in a plate thickness direction of the right inner wall 623 at one end portion of the right inner wall 623, which faces in the transverse direction Y. The through-hole 630 and the through-hole 624 are respectively placed at two opposite corners of the primary outer plate 62, which are diagonally opposite to each other at the primary outer plate 62. The through-hole 630 forms the first coolant tank hole 101.

A recess 631 is recessed at the other end portion of the right inner wall 623 which faces in the transverse direction Y. The recess 631 and the recess 625 are respectively placed at two opposite corners of the primary outer plate 62, which are diagonally opposite to each other at the primary outer plate 62. The recess 631 is communicated with the refrigerant passage 81. A through-hole 632 is formed at the recess 631 to extend through a bottom surface of the recess 631. Therefore, the through-hole 632 is placed adjacent to the outer wall 621 in the transverse direction Y. The through-hole 632 forms the second refrigerant tank hole 92. Therefore, the second refrigerant tank hole 92 is communicated with the refrigerant passage 81 through the recess 631. In the primary outer plate 62, the through-hole 632 serves as a flow outlet. As described above, in the primary outer plate 62, the through-hole (serving as the flow inlet) 626 and the through-hole (serving as the flow outlet) 632 are respectively formed at the two end portions (longitudinal end portions) of the primary outer plate 62 which are opposite to each other in the longitudinal direction X. Furthermore, the through-hole (serving as the flow inlet) 626 and the through-hole (serving as the flow outlet) 632 are respectively placed at the two opposite corners of the primary outer plate 62, which are diagonally opposite to each other at the primary outer plate 62.

Furthermore, a recess 633 is recessed at a location between the through-hole 630 and the recess 631 in the transverse direction Y. The recess 633 is placed on an opposite side of the through-hole (serving as the flow outlet) 632 which is opposite to the outer wall 621 in the transverse direction Y. The recess 633 is communicated with the refrigerant passage 81. A through-hole 634 is formed at the recess 633 and extends through the primary outer plate 62 such that the through-hole 634 extends through a bottom surface of the recess 633, and a shield wall 635 extends all around an outer periphery of the through hole 634. The shield wall 635 is formed to limit communication between the through-hole 634 and the recess 633. In other words, the shield wall 635 limits communication between the through-hole 634 and the refrigerant passage 81. The through-hole 634 forms the fifth refrigerant tank hole 95. At the primary outer plate 62, the through-hole 634 serves as a through-passage which is configured to conduct the refrigerant through the primary outer plate 62 without supplying the refrigerant to the refrigerant passage 81.

A communication passage 636, which communicates between the recess 631 and the recess 633, is formed at the right inner wall 623. A portion of the right inner wall 623, which is formed between the communication passage 636 and the refrigerant passage 81, functions as a rib 641 that partitions between the communication passage 636 and the refrigerant passage 81. At the primary outer plate 62, the rib 641 serves as a partition wall.

In the primary outer plate 62, the refrigerant, which flows from the first refrigerant tank hole 91 into the recess 625, directly flows into the left end portion of the refrigerant passage 81 as indicated by an arrow W11 or flows from the communication passage 629 into the left end portion of the refrigerant passage 81 through the recess 637 as indicated by an arrow W12. The refrigerant, which flows from the left end portion to the right end portion of the refrigerant passage 81, flows into the second refrigerant tank hole 92 through the recess 631 as indicated by an arrow W21 or flows from the recess 633 into the second refrigerant tank hole 92 through the communication passage 636 and the recess 631 as indicated by an arrow W22.

Figure 6:
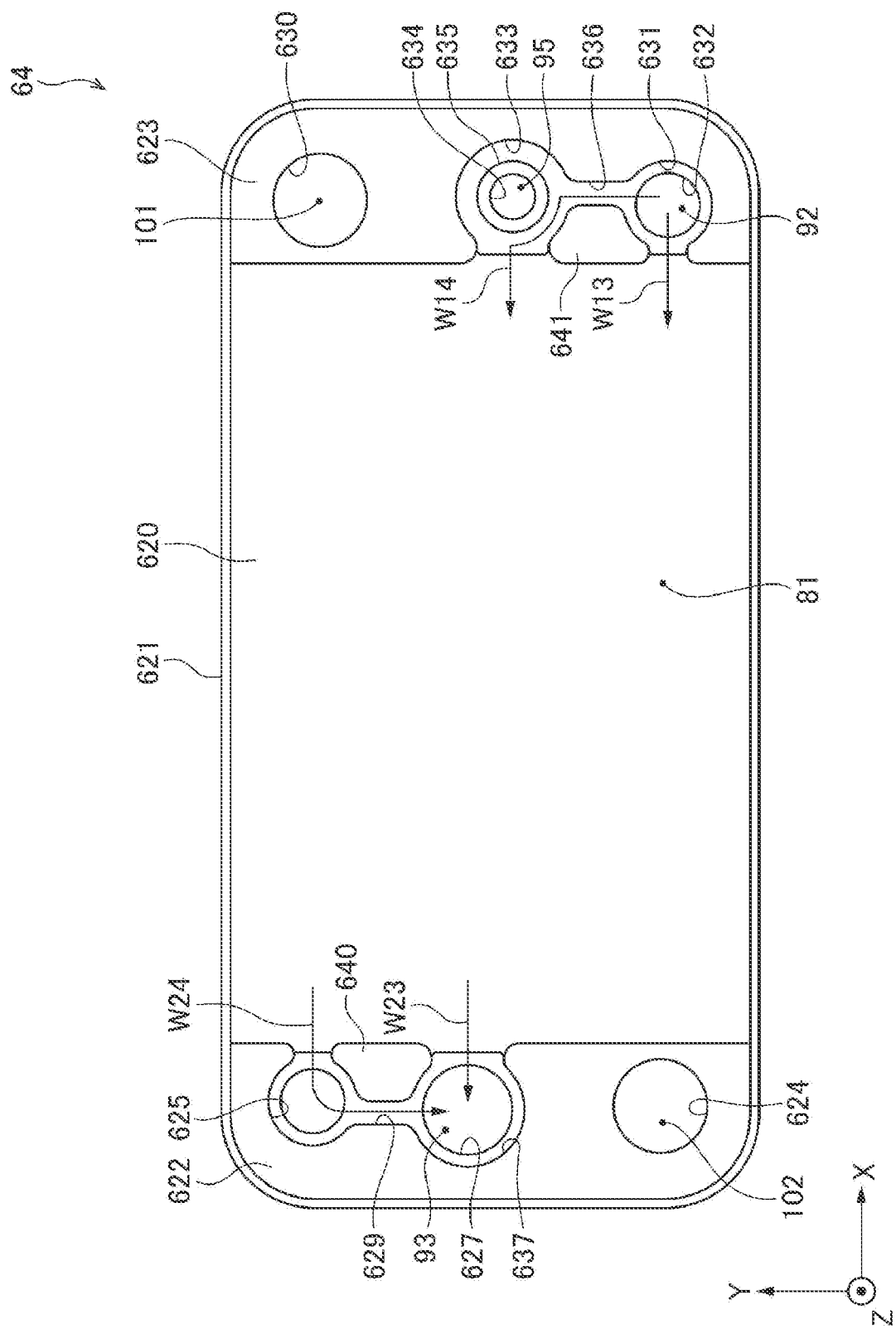
FIG. 6 is a plan view showing a plan-view structure of a secondary outer plate of the first embodiment.

Next, the structure of the secondary outer plate 64 will be described with reference to FIG. 6. As shown in FIG. 6, the secondary outer plate 64 has a structure which is similar to the primary outer plate 62. Therefore, portions of the secondary outer plate 64, which are the same as those of the primary outer plate 62, will be indicated by the same references signs and will not be redundantly described as much as possible.

As shown in FIG. 6, the secondary outer plate 64 differs from the primary outer plate 62 with respect to that the secondary outer plate 64 does not have the through-hole 626. Furthermore, in the secondary outer plate 64, the shield wall 628 is not formed, so that the through-hole 627 is communicated with the refrigerant passage 81 through the recess 637. The through-hole 627 of the secondary outer plate 64 forms the third refrigerant tank hole 93. At the secondary outer plate 64, the through-hole 627 serves as a flow outlet. Furthermore, the through-hole 632 serves as a flow inlet. Furthermore, the through-hole 634 serves as a through-passage which is configured to conduct the refrigerant through the secondary outer plate 64 without supplying the refrigerant to the refrigerant passage 81.

In the secondary outer plate 64, the refrigerant, which flows from the second refrigerant tank hole 92 into the recess 631, directly flows into the right end portion of the refrigerant passage 81 as indicated by an arrow W13 or flows from the communication passage 636 into the right end portion of the refrigerant passage 81 through the recess 633 as indicated by an arrow W14. The refrigerant, which flows from the right end portion to the left end portion of the refrigerant passage 81, flows into the third refrigerant tank hole 93 through the recess 637 as indicated by an arrow W23 or flows from the recess 625 into the third refrigerant tank hole 93 through the communication passage 629 and the recess 637 as indicated by an arrow W24.

Figure 7:
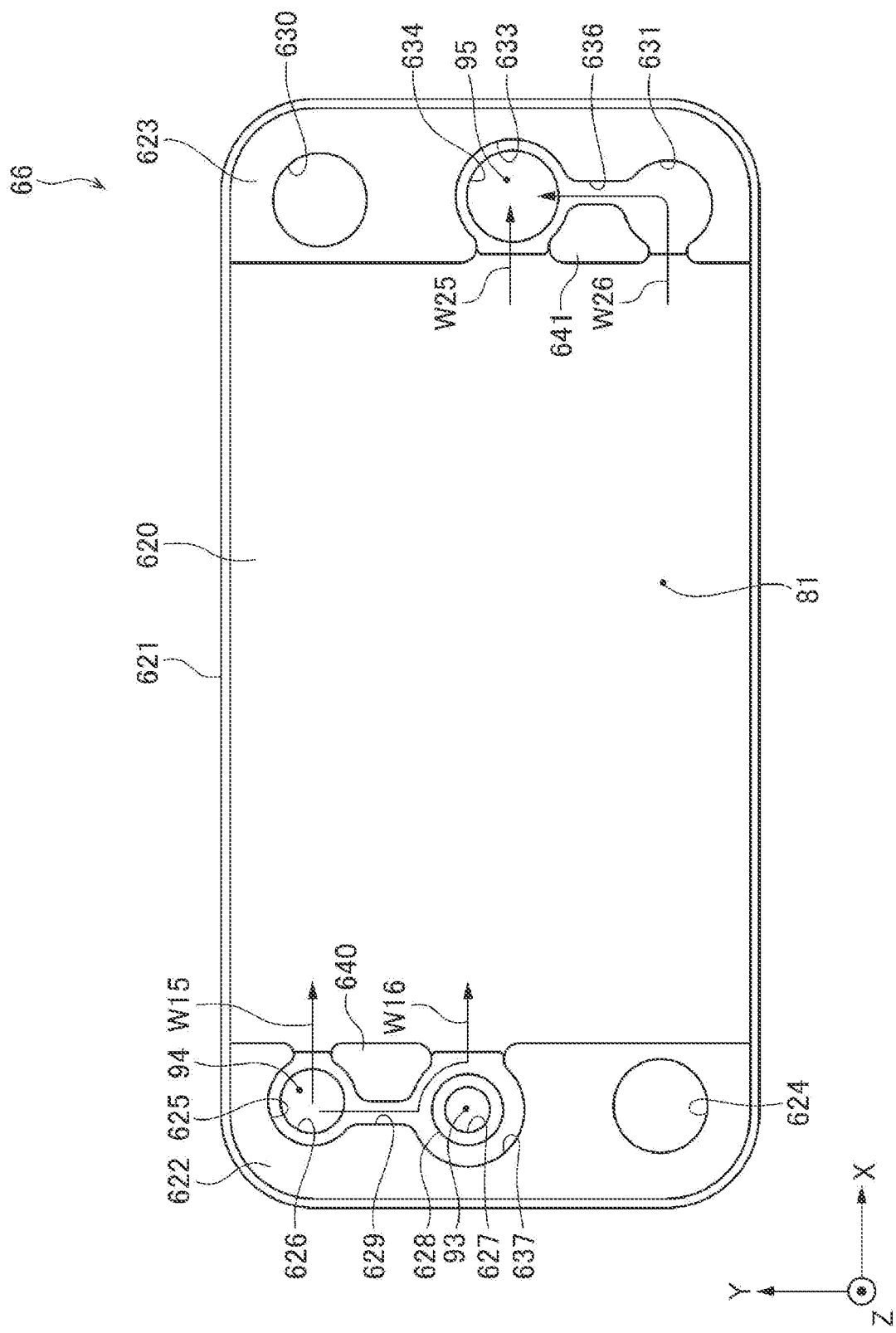
FIG. 7 is a plan view showing a plan-view structure of a tertiary outer plate of the first embodiment.

Next, the structure of the tertiary outer plate 66 will be described with reference to FIG. 7. As shown in FIG. 7, the tertiary outer plate 66 has the structure that is formed by rotating the secondary outer plate 64 by 180 degrees, and thereby the structure of the tertiary outer plate 66 is similar to the primary outer plate 62 like the secondary outer plate 64. Therefore, portions of the tertiary outer plate 66, which are the same as those of the primary outer plate 62, will be indicated by the same references signs and will not be redundantly described as much as possible.

As shown in FIG. 7, the tertiary outer plate 66 differs from the primary outer plate 62 with respect to that the tertiary outer plate 66 does not have the through-hole 632. Furthermore, in the tertiary outer plate 66, the shield wall 635 is not formed, so that the through-hole 634 is communicated with the refrigerant passage 81 through the recess 633. Furthermore, in the tertiary outer plate 66, the through-hole 626 forms the fourth refrigerant tank hole 94, and the through-hole 627 forms the third refrigerant tank hole 93. The communication of the third refrigerant tank hole 93 to the refrigerant passage 81 is blocked by the shield wall 628. At the tertiary outer plate 66, the through-hole 626 serves as a flow inlet, and the through-hole 634 serves as a flow outlet. Furthermore, the through-hole 627 serves as a through-passage which is configured to conduct the refrigerant through the tertiary outer plate 66 without supplying the refrigerant to the refrigerant passage 81.

In the tertiary outer plate 66, the refrigerant, which flows from the fourth refrigerant tank hole 94 into the recess 625, directly flows into the left end portion of the refrigerant passage 81 as indicated by an arrow W15 or flows from the communication passage 629 into the left end portion of the refrigerant passage 81 through the recess 637 as indicated by an arrow W16. The refrigerant, which flows from the left end portion to the right end portion of the refrigerant passage 81, flows into the fifth refrigerant tank hole 95 through the recess 633 as indicated by an arrow W25 or flows from the recess 631 into the fifth refrigerant tank hole 95 through the communication passage 636 and the recess 633 as indicated by an arrow W26.

According to the heat exchanger 10 of the present embodiment described above, the following actions and advantages indicated at the following sections (1) and (2) can be achieved. The primary outer plate 62, the secondary outer plate 64 and the tertiary outer plate 66 provide actions and advantages, which are the same as or similar to each other. Therefore, in the following description, the actions and advantages of the primary outer plate 62 will be representatively described.

Figure 8:
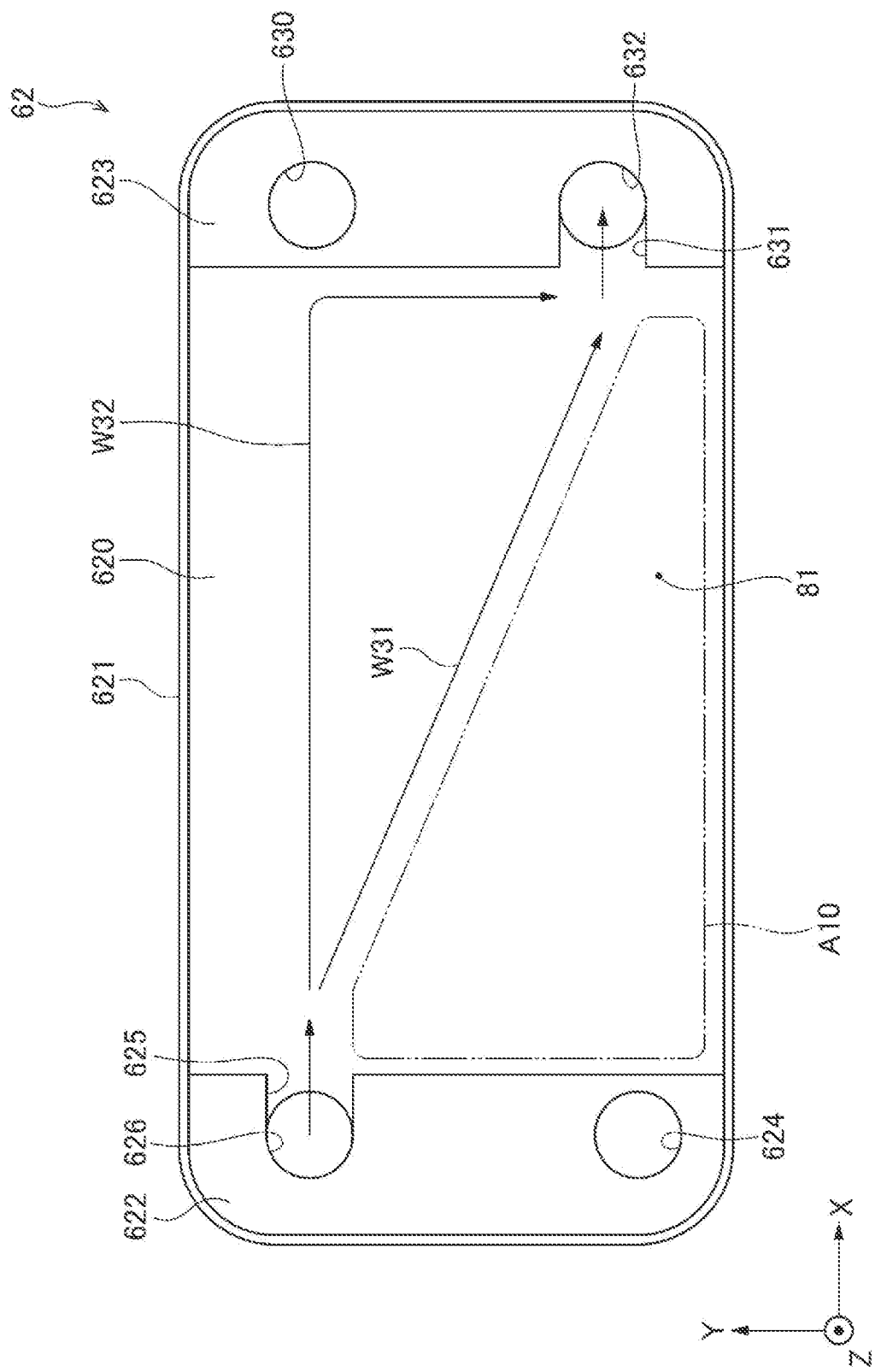
FIG. 8 is a plan view showing a plan-view structure of an outer plate of a comparative example.

(1) In a case where the recesses 633, 637 and the communication passages 629, 636 are not formed at the primary outer plate 62 as indicated in a comparative example shown FIG. 8, at the refrigerant passage 81, the refrigerant flows from the recess 625 to the recess 631 as indicated by an arrow W31, or the refrigerant flows from the recess 625 along the outer wall 621 in the longitudinal direction X and then flows along the right inner wall 623 as indicated by an arrow W32. Therefore, in a region A10, which is indicated by a dot-dot-dash line, there is likely to be formed a zone, in which the refrigerant is less likely to flow, i.e., a so-called dead water zone (stagnated flow zone). With respect this point, in the primary outer plate 62 of the present embodiment shown in FIG. 5, the refrigerant flows from the first refrigerant tank hole 91 into the refrigerant passage 81 through the communication passage 629 and the recess 637 as indicated by the arrow W12, and thereby another flow, which is indicated by an arrow W33, can be newly formed. As a result, the region, in which the dead water zone is likely to be formed, becomes a region A11 which is indicated by a dot-dot-dash line in FIG. 5, and thereby a size of this region can be reduced. Therefore, it is possible to reduce the pressure loss of the refrigerant. Furthermore, by reducing the size of the dead water zone, the flow rate of the refrigerant, which flows along the refrigerant fin 111 is increased. Therefore, the heat exchange performance of the heat exchanger 10 can be improved.

(2) As shown in FIG. 8, in the case where the communication passages 629, 636 are not formed at the primary outer plate 62, each of the recesses 625, 631 is shaped in the annular form. In this case, at the inside of the recess 631, the refrigerant, which flows into the recess 631, tends to generate a vortex flow toward the through-hole 632, and thereby the refrigerant may possibly have a vortex loss. This will also increase the pressure loss of the refrigerant. In this regard, as shown in FIG. 5, at the primary outer plate 62, since the recess 631 is communicated with the recess 633 through the communication passage 636, the refrigerant is less likely to form the vortex flow at the inside of the recess 631. Therefore, since the refrigerant is less likely to have the vortex loss, it is possible to reduce the pressure loss of the refrigerant.

First Modification

Next, a first modification of the heat exchanger 10 of the first embodiment will be described.

At the primary outer plate 62, the position of each of the through-holes 624, 626, 627, which are formed at the left inner wall 622, and the position of each of the through-holes 630, 632, 634, which are formed at the right inner wall 623, may be changed as appropriate.

Figure 9:
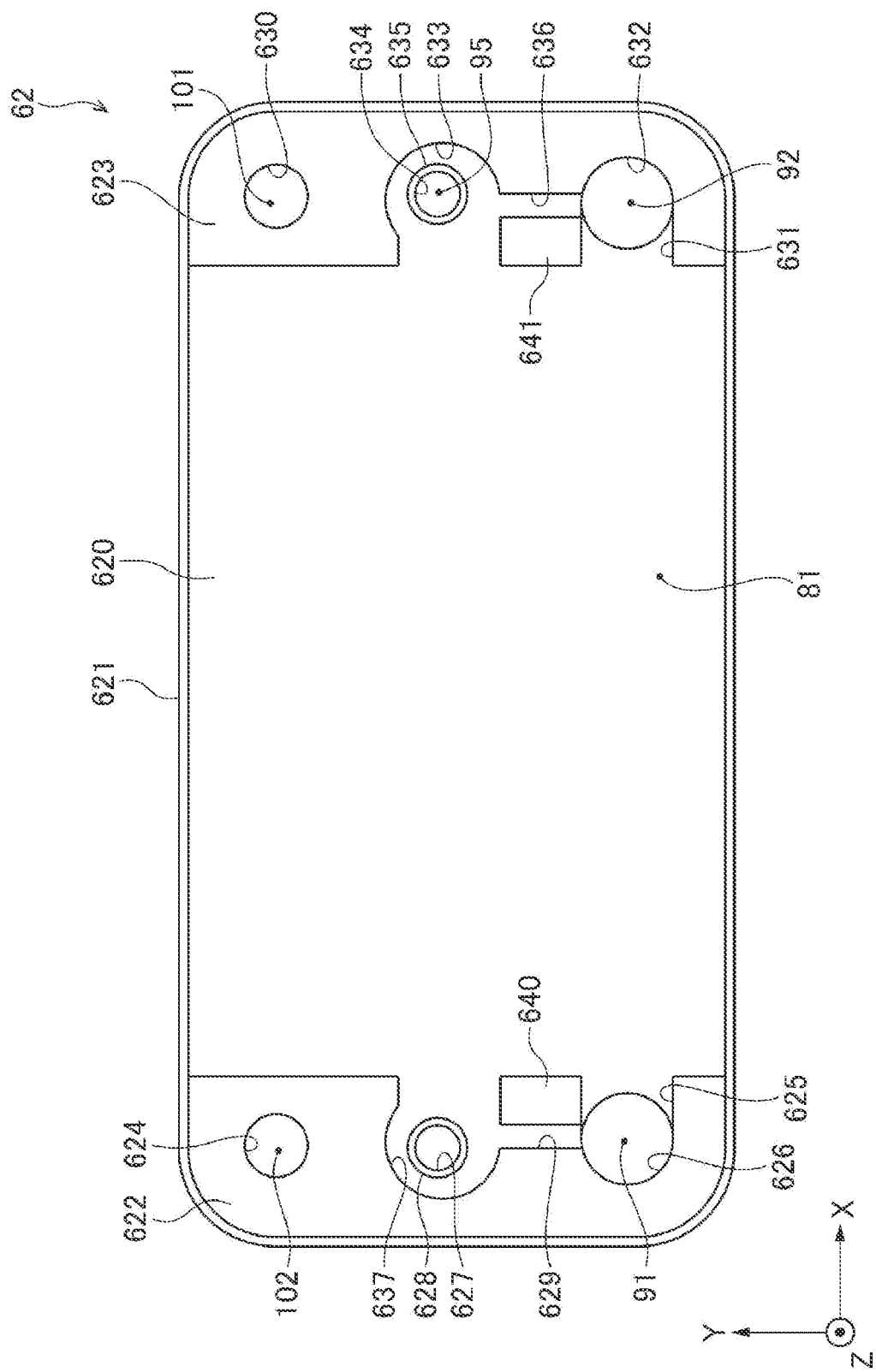
FIG. 9 is a plan view showing a plan-view structure of a primary outer plate of a first modification of the first embodiment.

For example, as shown in FIG. 9, the through-hole 624 of the left inner wall 622 and the through-hole 630 of right inner wall 623 may be opposed to each other in the longitudinal direction X, and the through-hole 626 of the left inner wall 622 and the through-hole 632 of the right inner wall 623 may be opposed to each other in the longitudinal direction X.

Figure 10:
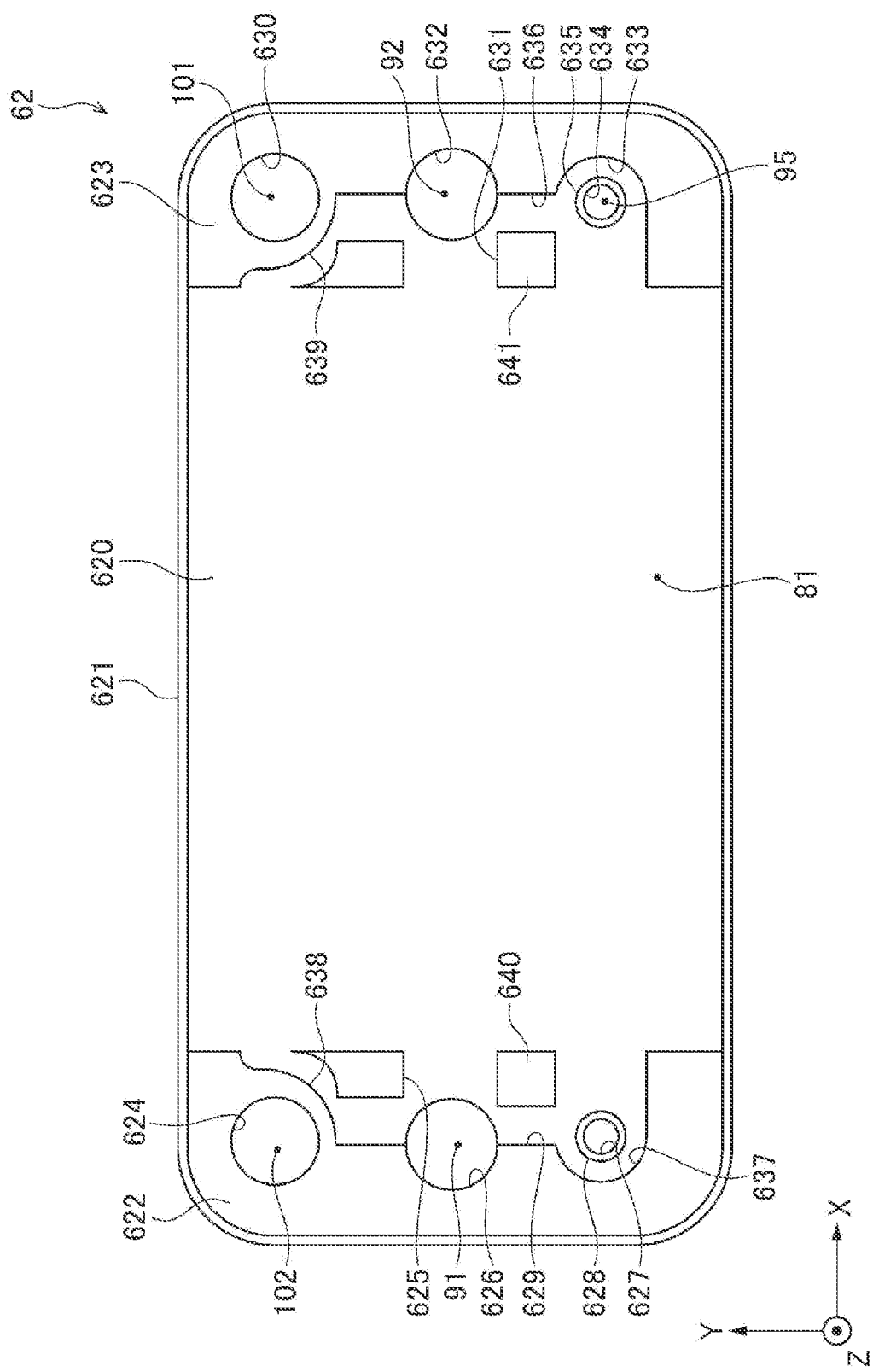
FIG. 10 is a plan view showing a plan-view structure of a primary outer plate of the first modification of the first embodiment.

Furthermore, as shown in FIG. 10, the through-hole 624 of the left inner wall 622 and the through-hole 630 of right inner wall 623 may be opposed to each other in the longitudinal direction X, and the through-hole 626 of the left inner wall 622 and the through-hole 632 of the right inner wall 623 may be opposed to each other in the longitudinal direction X, and the through-hole 627 of the left inner wall 622 and the through-hole 634 of the right inner wall 623 may be opposed to each other in the longitudinal direction X. Here, as shown in FIG. 10, a communication passage 638 may be formed at the left inner wall 622 such that the communication passage 638 extends from the through-hole 626 and passes through an outer peripheral portion of the through-hole 624 all the way to the refrigerant passage 81. Similarly, a communication passage 639 may be formed at the right inner wall 623 such that the communication passage 639 extends from the through-hole 632 and passes through an outer peripheral portion of the through-hole 630 all the way to the refrigerant passage 81.

Figure 11:
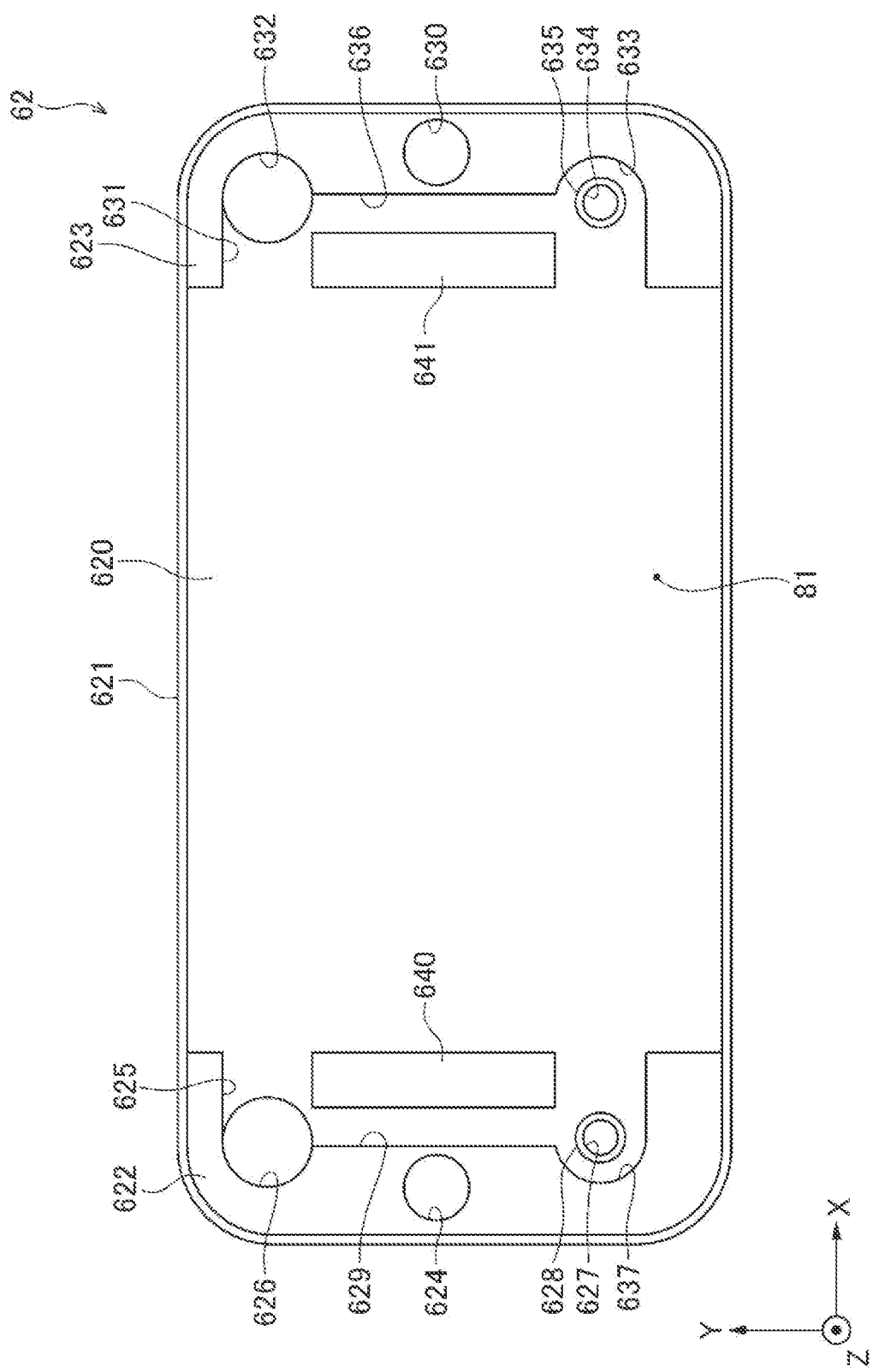
FIG. 11 is a plan view showing a plan-view structure of a primary outer plate of the first modification of the first embodiment.

Furthermore, as shown in FIG. 11, the through-holes 626, 627 may be placed at two opposite end portions (transverse end portions), respectively, of the left inner wall 622, which are opposite to each other in the transverse direction Y, and the through-hole 624 may be placed between the through-holes 626, 627. Similarly, the through-holes 632, 634 may be placed at two opposite end portions (transverse end portions), respectively, of the right inner wall 623, which are opposite to each other in the transverse direction Y, and the through-hole 630 may be placed between the through-holes 632, 634.

Second Embodiment

Next, a heat exchanger 10 of a second embodiment will be described. The following description focuses on the differences relative to the heat exchanger 10 of the first embodiment.

Figure 12:
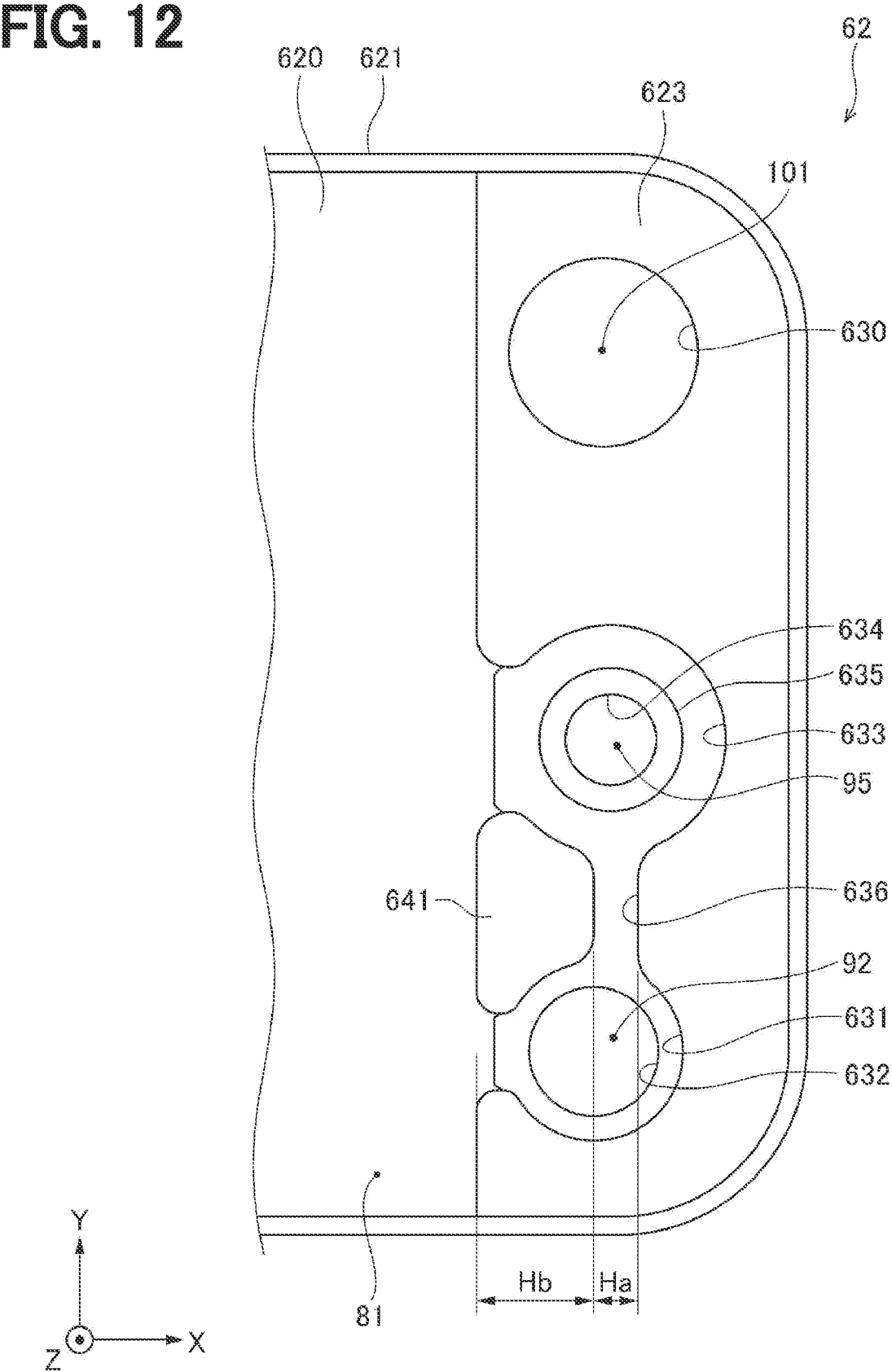
FIG. 12 is an enlarged view showing an enlarged-view structure of an end portion of a primary outer plate of a second embodiment.

As shown in FIG. 12, when the communication passage 636 is formed at the right inner wall 623 of the primary outer plate 62, the rib 641 is formed between the communication passage 636 of the right inner wall 623 and the refrigerant passage 81. Therefore, the bottom surface of the corresponding inner plate 70 is partially joined to the primary outer plate 62 at the rib 641, and thereby the strength tends to be reduced at the joint between the rib 641 and the corresponding inner plate 70. In view of this point, the inventors of the present application have conducted experiments and have obtained the number of repetitions of pressurization at the time of changing the width Ha of the communication passage 636 and the width Hb of the rib 641. The number of repetitions of pressurization is the number of repetitions of pressurization at which damage first occurs around the rib 641 through the repetitions of the pressurization of the core 20.

Figure 13:
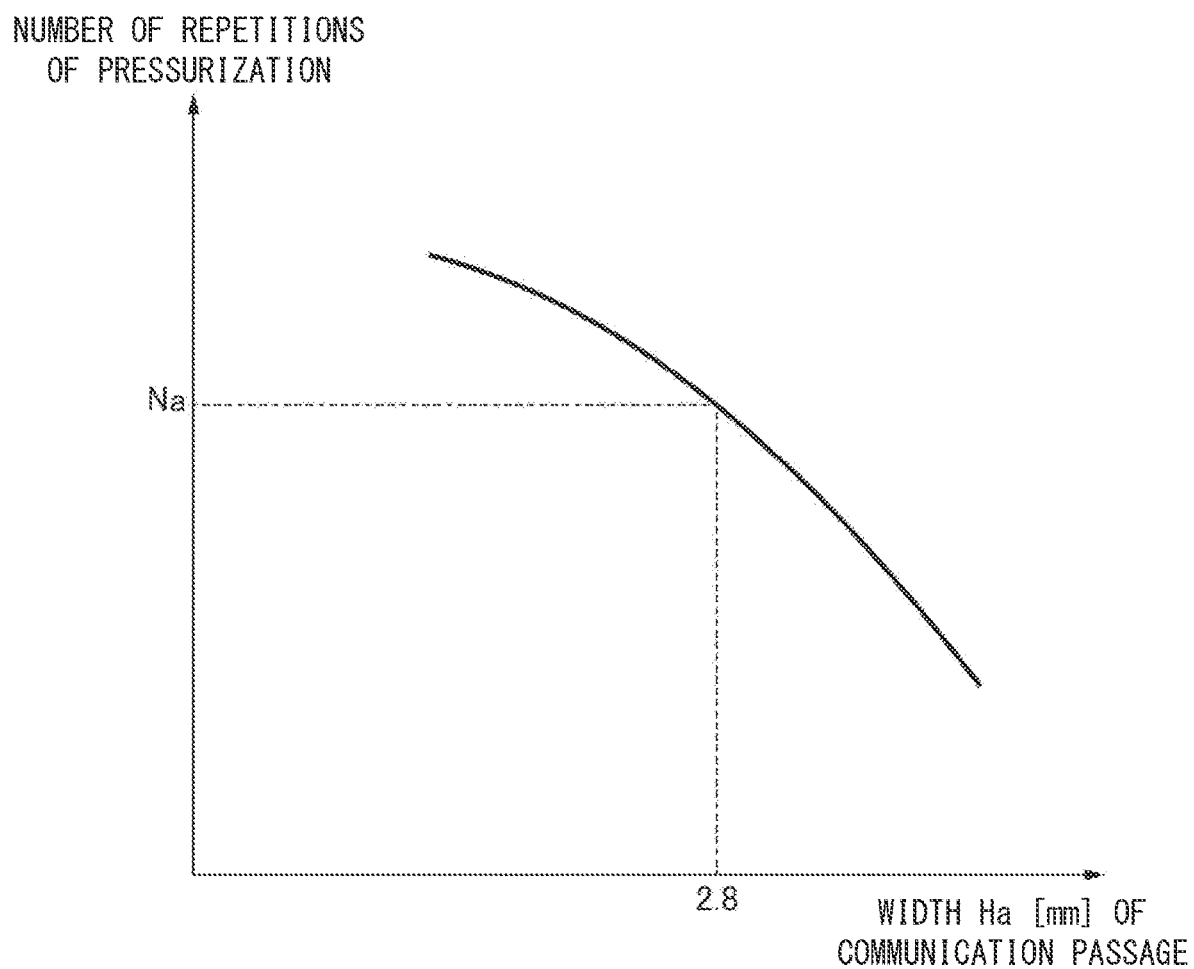
FIG. 13 is a graph showing a relationship between a width of a communication passage and the number of repetitions of pressurization according to the second embodiment.

FIG. 13 is a graph indicating the relationship between the width Ha of the communication passage 636 and the number of repetitions of pressurization obtained through the experiments of the inventors. Furthermore, FIG. 14 is a graph indicating the relationship between the width Hb of the rib 641 and the number of repetitions of pressurization obtained through the experiments of the inventors.

As shown in FIG. 13, when the width Ha of the communication passage 636 is 2.8 [mm], the number of repetitions of pressurization is a predetermined number Na. Furthermore, it is confirmed through the experiments that when the width Ha of the communication passage is set to be equal to or smaller than 2.8 [mm], the number of repetitions of pressurization is equal to or larger than the predetermined number Na.

Furthermore, as shown in FIG. 14, when the width Hb of the rib 641 is equal to or larger than 5.0 [mm], the number of repetitions of pressurization is a predetermined number Nb. Furthermore, it is confirmed through the experiments that when the width Hb of the rib 641 is set to be equal to or larger than 5.0 [mm], the number of repetitions of pressurization can be maintained at the predetermined number Nb.

According to the heat exchanger 10 of the present embodiment described above, the following actions and advantages indicated at the following section (3) can be achieved.

(3) The width Hb of the communication passage 636 is set to be equal to or smaller than 2.8 [mm]. Furthermore, the width Hb of the rib 641 is set to be equal to or larger than 5 [mm]. With this configuration, the pressure resistance strength of the core 20 can be ensured.

The above embodiments may be modified as follows.

The passages of the refrigerant and the passages of the coolant at the heat exchanger 10 may be modified as appropriate.

The present disclosure is not limited to the above specific examples. Appropriate design changes made by those skilled in the art to the above specific examples are also included in the scope of the present disclosure as long as they have the features of the present disclosure. Each element included in each specific example described above, and its arrangement, conditions, shape, etc., are not limited to those illustrated and can be changed as appropriate. As long as there is no technical contradiction, the combination of the elements included in the specific examples described above can be changed as appropriate.

What is claimed is:

1. A heat exchanger comprising a plurality of plate members which are stacked together to form a plurality of refrigerant passages and a plurality of fluid passages, wherein the heat exchanger is configured to exchange heat between a refrigerant flowing through the plurality of refrigerant passages and a fluid flowing through the plurality of fluid passages, wherein at least one plate member among the plurality of plate members includes:
   a flow inlet which is placed at one end portion of a corresponding refrigerant passage among the plurality of refrigerant passages, wherein the corresponding refrigerant passage is formed at the at least one plate member, and the flow inlet is configured to input the refrigerant into the corresponding refrigerant passage;
   a flow outlet which is placed at another end portion of the corresponding refrigerant passage and is configured to output the refrigerant conducted through the corresponding refrigerant passage;
   a recess which is placed adjacent to one of the flow inlet and the flow outlet and is communicated with the corresponding refrigerant passage;
   a communication passage which is configured to communicate the one of the flow inlet and the flow outlet to the recess;
   a partition wall which partitions between the corresponding refrigerant passage and the communication passage; and
   a through-passage which is formed at the recess and extends through the at least one plate member, wherein the through-passage is configured to conduct the refrigerant through the at least one plate member without supplying the refrigerant to the corresponding refrigerant passage.

2. The heat exchanger according to claim 1, wherein:
   a cross-section of the at least one plate member, which is perpendicular to a stacking direction of the plurality of plate members, is shaped in a rectangular form;
   the flow inlet and the flow outlet are respectively formed at two end portions of the at least one plate member which are opposite to each other in a longitudinal direction of the at least one plate member;
   the flow outlet is placed adjacent to an outer wall of the at least one plate member in a transverse direction of the at least one plate member; and
   the recess is placed on an opposite side of the flow outlet, which is opposite to the outer wall in the transverse direction of the at least one plate member.

3. The heat exchanger according to claim 1, wherein the flow inlet and the flow outlet are respectively placed at two opposite corners of the at least one plate member, which are diagonally opposite to each other at the at least one plate member.

4. The heat exchanger according to claim 1, wherein a width of the communication passage is set to be equal to or smaller than 2.8 mm.

5. The heat exchanger according to claim 1, wherein a width of the partition wall, which is measured from the corresponding refrigerant passage to the communication passage, is set to be equal to or larger than 5.0 mm.

\* \* \* \* \*